Sept. 27, 1932.    S. A. WILSON    1,880,030
SHOCK ABSORBER
Filed Aug. 4, 1930    2 Sheets-Sheet 1
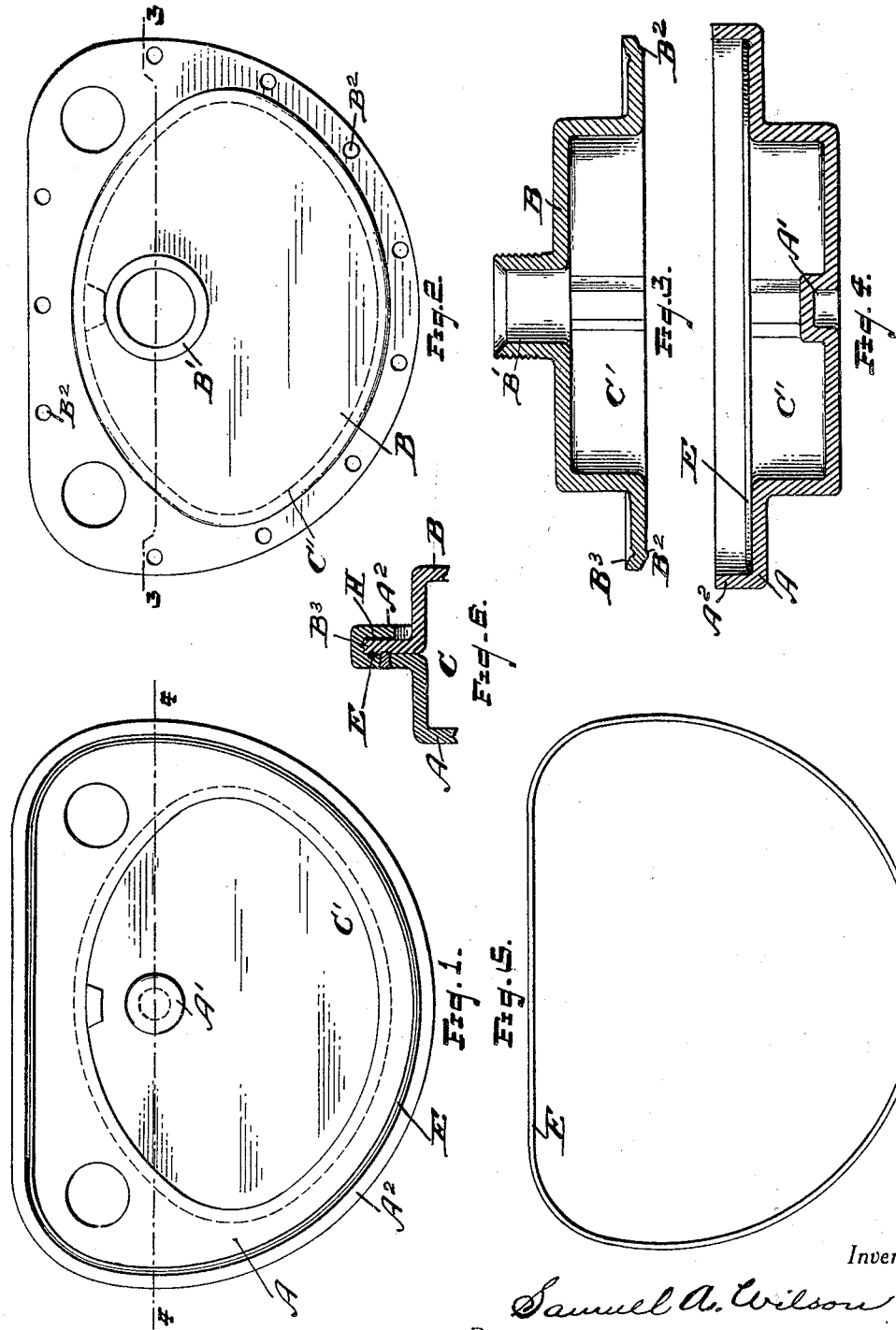
Inventor
Samuel A. Wilson
By S. E. Thomas
Attorney

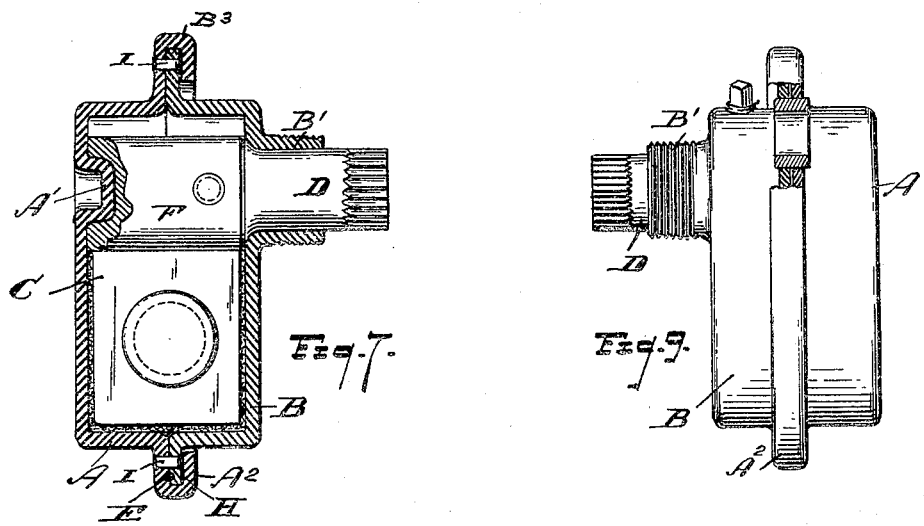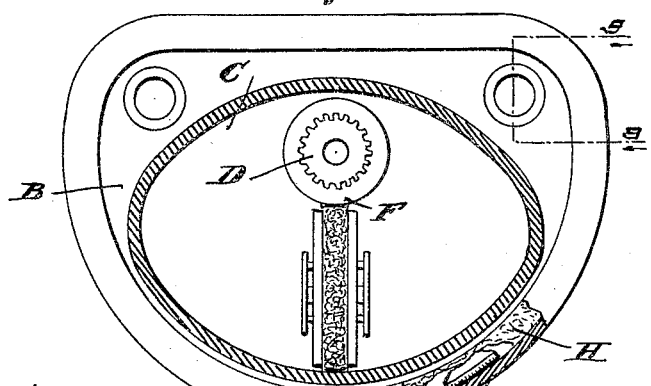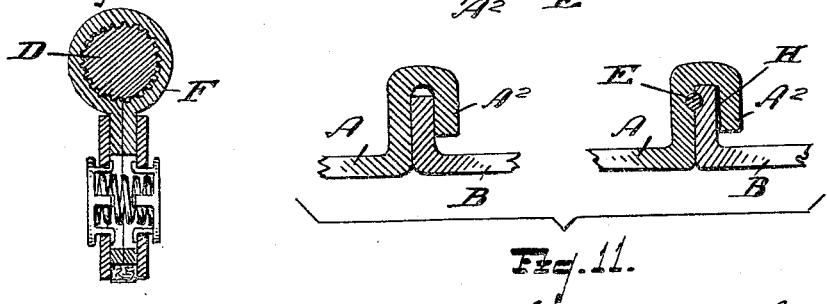

Patented Sept. 27, 1932

1,880,030

UNITED STATES PATENT OFFICE

SAMUEL A. WILSON, OF DETROIT, MICHIGAN, ASSIGNOR TO MECHANICAL DEVELOPMENT COMPANY, OF DETROIT, MICHIGAN, A CORPORATION OF MICHIGAN

SHOCK ABSORBER

Application filed August 4, 1930. Serial No. 472,854.

My invention relates to an improvement in hydraulic shock absorbers, in which the fluid containing casing is formed in two parts from stamped sheet metal connected together by folding the rim of one portion over the back of the circumferential rim of the other portion.

It has been difficult however to construct a fluid chamber of this character so as to prevent fluid leaks, caused by high hydrostatic pressures distorting the casing sufficiently to distroy the sealing effect of the ordinary gasket.

The object therefore of the present invention is to provide means designed to prevent distortion of the junction flanges of the respective portions comprising the casing, and to supply a novel sealing means insuring against leakage.

With the foregoing and other objects in view which will appear as the description proceeds, the invention further resides in the combination and arrangement of parts and in the details of construction hereinafter described and claimed, it being understood that changes may be made in the precise embodiment of the invention herewith shown without departing from the spirit of the same.

In the drawings accompanying this specification:

Figure 1 is a side elevation showing the inside of the back portion of a metal stamping comprising one portion of a casing formed in two parts;—the view also discloses an annular relatively hard steel wire gasket in position to engage and indent the respective walls of the front and back portions of the casing when assembled and thereby effect a hydrostatic seal between the parts.

Figure 2 is an elevation of the front portion of the casing as viewed from the outside of the latter.

Figure 3 is a cross-sectional view of the front portion of the casing, taken on or about line 3—3 of Figure 2.

Figure 4 is a cross-sectional view of the back portion of the casing, taken on or about line 4—4 of Figure 1.

Figure 5 is an elevation of the annular wire gasket comprising a hardened steel wire loop,—circular in cross-section.

Figure 6 is a fragmentary cross-sectional view through the united portions of the casing, showing a "weld point" to secure the flanges of the casing against displacement.

Figure 7 is a cross-sectional view showing the front and rear portions of the casing assembled to inclose a shock absorber mechanism, with the flanges of each portion of the casing riveted together to prevent displacement.

Figure 8 is a sectional view and side elevation of the shock absorber with a portion of its connecting rims broken away and in section to disclose the sealing wire, and also a paper or other gasket.

Figure 9 is an end elevation of the shock absorber showing a portion broken away and in section,—taken on or about line 9—9 of Figure 8,—showing one of a pair of sleeves connecting and welded to the respective portions of the casing;—through which extend bolts (not shown) for attaching the device to the frame of an automobile.

Figure 10 is a cross-sectional view of an impeller assembly removed from the casing.

Figure 11 indicates respectively two fragmentary cross-sectional views of the joint connecting the front and rear portions of the casing;—in one a hardened steel wire gasket has been deleted to disclose by comparison its sealing effect upon the overlapped edge of the flange of one portion in relation to the overlapping wall of the other portion of the casing, a space being thus left between the edge of the flange and the overlapping wall, which on account of the high hydrostatic pressures the casing is required to carry, is apt to develop leaks;—the other detail includes the hardened steel wire gasket embedded under pressure of the forming dies in contiguous walls of the connecting members,—the gasket being relatively near the perimeter of one of said members is shown to have forced its edge outwardly under the pressure of the forming dies into intimate contact with the arc-shaped overlapping member,—thereby closing the space between its edge and the overlapping member, thus forming a perfect sealing contact.

Referring now to the letters of reference placed upon the drawings:

A denotes the back portion of a casing, stamped from sheet metal with a bearing hub $A^1$ extending inwardly into one portion of a chamber, to receive the end of the shaft of a shock absorber mechanism.

$A^2$ is an annular flange integral with the back portions of the casing, overlapping the outside circumferential edge of the front casing B, which is likewise formed with a chambered portion $C^1$ coordinating with the chambered portion $C^1$ of the back casing,—thereby providing a chamber C,—to receive and house a shock absorber mechanism.

The front casing B is also constructed with an annular projecting sleeve $B^1$, forming an outer bearing for the shaft D, of a shock absorber mechanism, with a screw-thread on its outer face to receive a gland packing-nut,—not shown,—to insure against leakage.

E denotes a wire ring of hardened steel, lodged in the casing A, adjacent the inner face of the outstanding flange $A^2$, see Figures 1 and 4.

Adjacent the circumferential edge of the front casing B, are a number of projections $B^2$ see Figure 2,—formed by indenting the opposite face of the wall,— the raised spots being welded to the flange of the wall of the back casing. A slight bend ($B^3$) is given the marginal edge of the flange of the front casing to provide clearance for the wire gasket E, when assembling the parts of the casing together, to permit contact between the projections $B^2$ of the flange of the front portion of the casing and the body of the rear portion of the casing,—notwithstanding the wire gasket,—thus insuring closer contact between the walls of the casing when pressed together.

The parts are assembled by first placing in position on the back portion A of the casing the wire gasket E. An impeller assembly F,—see Figure 10,—with its shaft G is then mounted at its inner end on the bearing hub $A^1$,—see Figure 7,—the projecting end of the shaft D being journaled in the sleeve $B^1$, formed integral with the front casing B,—the latter is then placed over the impeller assembly and forced into the back casing A.

The front and back portions of the casing are welded or riveted together as indicated at I, see Figure 7,—the flange of the back portion being folded over the projecting rim of the front portion of the casing—with a paper, cork or other gasket H between the walls. The hardened-wire ring gasket E is forced by suitable dies under heavy pressure into the softer material forming the respective portions of the casing, see Figures 6 and 7;—while the upturned edge $B^3$ of the front casing is flattened by the operation into intimate contact with the wall of the rear casing.

The object in first riveting or welding the walls of the front and rear portions of the casing together prior to folding the wall of the rear portion of the casing over the flange of the front portion of the casing, is to insure against the shifting of the respective parts in relation to each other due to high hydrostatic pressures created by the operation of the device. It also serves to secure the parts against shifting during the act of folding the metal over the wire gasket inserted between the walls of the respective portions.

The hardened steel wire gasket E is embedded under pressure into the respective contiguous walls of the front and back portions of the sheet metal casing, while the overlapped edge of one portion of the casing is forced into intimate sealing contact with the overlapping wall of the other portion of the casing,—thus insuring a hydrostatic seal between the respective parts of the divided casing.

While I have shown welding points at spaced intervals adjacent the marginal edge of the casing to insure the parts of the casing against shifting in relation to each other,—thereby causing leaks through the distortion of the casing due to high hydraulic pressure, the parts may be riveted together as shown in Figure 7,—the construction indicated being otherwise the same.

Having thus described my invention, what I claim is:

1. In a hydraulic shock absorber, a divided sheet metal casing having overlapping marginal surfaces, adapted to be joined to form a single unit to house an oscillating piston; and a hard-metal gasket located between and embedded in the respective contiguous marginal portions of the sheet metal casing and adjacent the edge of one portion and the corner formed by the surface of the portion overlapping said edge, whereby an intimate sealing relation is effected between the lapped and overlapped marginal surfaces of the respective members.

2. In a hydraulic shock absorber, a divided sheet metal casing having contiguous overlapping marginal surfaces joined together to form a single unit, adapted to house an oscillating piston including valves governing the passage of fluid contained in said casing in alternate directions through said piston; a hard-metal wire gasket located between and embedded in the contiguous marginal surfaces of the respective portions of the sheet metal casing; and means for rigidly securing the contiguous marginal surfaces together, whereby the parts are held against shifting in relation to each other as a result of high hydrostatic pressures in the operation of the device.

3. A structure as specified in claim 2 in combination with a gasket of fibrous material located between the overlapping marginal portion of one member of said casing and the overlapped marginal surface of the other portion of said casing.

4. In a hydraulic shock absorber, comprising a divided sheet metal casing having contiguous marginal surfaces joined together to form a single unit, with a chambered portion to receive an oscillating piston fitted with valves governing the passage of fluid contained in said chamber in alternate directions through said piston; a hard metal wire gasket located between the contiguous marginal surfaces of the divided sheet metal casing; and means for rigidly securing the contiguous marginal surfaces together, the marginal surface of one portion of said casing overlapping the marginal surface and edge of the other portion of the casing, said hard metal wire gasket being embedded in recesses formed in the opposing marginal surfaces of the respective portions of the casing, thereby providing a sealing relation between the respective contiguous marginal surfaces of the divided casing.

In testimony whereof, I sign this specification.

SAMUEL A. WILSON.